April 8, 1958  L. W. HAYES  2,829,503

FLOATING PIPE DRIVING HEAD

Filed July 17, 1956

INVENTOR.
Lawrence W. Hayes
BY Victor J. Evans & Co.
ATTORNEYS

United States Patent Office 2,829,503
Patented Apr. 8, 1958

2,829,503

FLOATING PIPE DRIVING HEAD

Lawrence W. Hayes, New Kensington, Pa.

Application July 17, 1956, Serial No. 598,280

3 Claims. (Cl. 61—77)

This invention relates to machinery and equipment for driving service lines under highways, railroads, and the like, and in particular a driving head for connecting power means, such as a pneumatic hammer to the end of a pipe with a floating element therein whereby instead of battering the end of a fixed pipe the load is taken by a floating member in the driving head which absorbs the shock and thereby protects the pipe.

The purpose of this invention is to increase the life of driving heads particularly for service pipe lines wherein conventional driving heads for this use break and are discarded after several service lines are driven thereby.

With the conventional type of driving head, a pipe is rigidly connected to the head whereby, with a hammer driving on the opposite side of the head, there is no possibility of yielding or of the parts moving laterally to absorb shock loads and with the driving head rigidly held the strains and stresses are excessive, resulting in cracks and breaks in the driving head which make it necessary to discard the head.

With this thought in mind this invention contemplates driving heads for a pipe line in which slight clearance is provided between the pilot pin, upon which the pipe is positioned, and the body of the driving head whereby a slight floating action is obtained and this floating action is sufficient to relieve the direct shock load from the hammer against the pipe that is transmitted through the driving head of a conventional mounting.

The object of this invention is, therefore, to mount a pilot pin in a driving head of a machine for driving pipe lines below highways, railroad tracks and the like wherein means is provided for absorbing the direct shock load of the hammer normally transmitted to the pipe.

Another object of the invention is to provide a floating action in a driving head of service pipe lines in which the improved driving head is adapted to be used with the same equipment as the conventional driving head so that changes in the parts are not required.

A further object of the invention is to provide an improved driving head for service pipe lines in which floating action is obtained in the head and in which the head is of a simple and economical construction.

With these and other objects and advantages in view the invention embodies a cylindrical driving head having an adapter receiving socket in one end with a pilot pin pivotally mounted in a socket in the opposite end and in which a slight clearance is provided between the pilot pin and head to produce a floating action.

Other features and advantages of the invention will appear from the following description taken in connection with the drawing, wherein.

Figure 1:
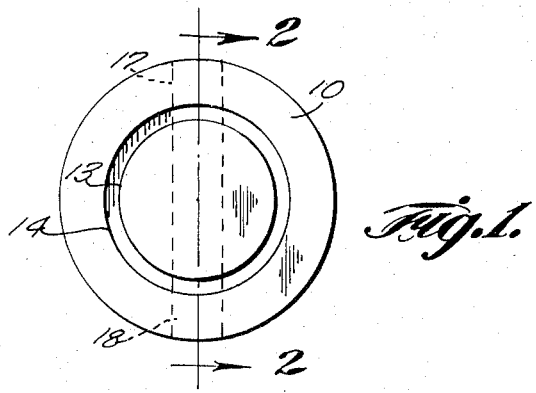
Figure 1 is an end elevational view of the improved driving head looking toward the end in which the pipe is inserted.
Figure 2:
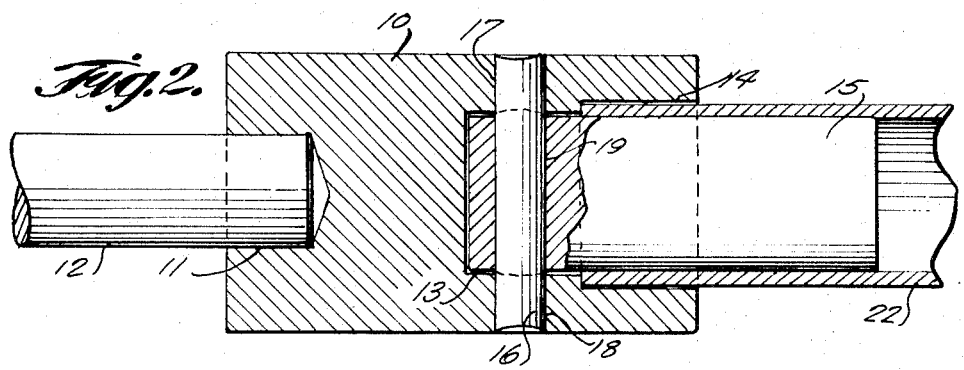
Figure 2 is a longitudinal section through the driving head taken on line 2—2 of Fig. 1 showing the end of a piece of tubing or pipe positioned over the pilot pin.
Figure 3:
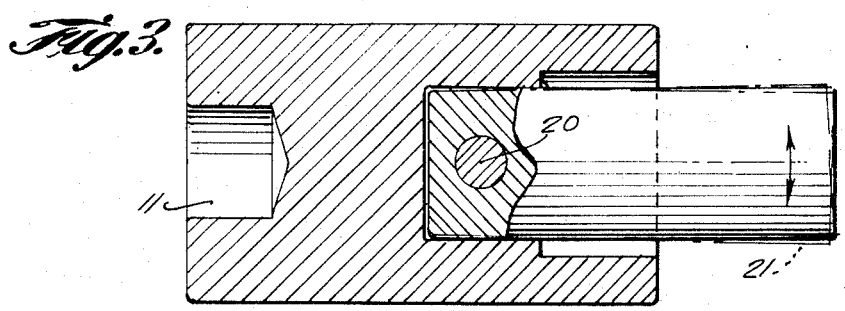
Figure 3 is a longitudinal section similar to that shown in Fig. 2 taken from a point at a right angle to that shown in Fig. 2 and showing, in particular, variable positions of the pilot pin in broken lines.
Figure 4:
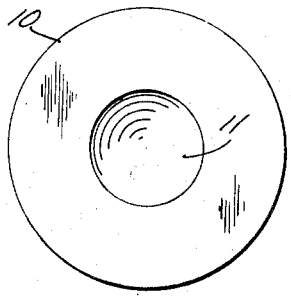
Figure 4 is an end elevational view of the driving head looking toward the end in which the socket for the adapter of the pneumatic hammer is provided.

Referring now to the drawing wherein like reference characters denote corresponding parts, the improved driving head of this invention includes a cylindrical body 10 having a socket 11 in one end for receiving an adapter 12 of a pneumatic hammer and having a socket 13 with a counterbore 14 therein in the opposite end, a pilot pin 15 positioned in the socket 13, and a pivot pin 16 mounted in openings 17 and 18 in the body 10 and extended through an opening 19 in the inner end of the pilot pin 15, whereby with a slight clearance around the pilot pin the pin is adapted to move laterally about the center 20 of the pin 16, as indicated by the broken line 21, in Fig. 3, and this slight pivotal action produces a floating connection whereby, instead of being retained in exact actual alignment the pipe may work back and forth, producing a floating action wherein a cushion is provided between the driving element and pipe so that extreme shock loads are not required to be taken by the driving head.

In extending a service line below a highway, railroad, or the like a pipe, such as the pipe 22 is positioned over the pilot pin 15 and in the counterbore 14 with the parts in position, an adapter or stud 12 of a pneumatic hammer is inserted in the socket 11 whereby with power applied to the hammer the driving force is transmitted through the body 10 to the pipe 22 and with slight clearance between the parts the head or body 10 is adapted to move with a slight swinging or floating action wherein the rigidity of a pilot connection is eliminated. By this means and with the rigidity of the connection removed the life of the driving head is extended indefinitely.

It will be understood that modifications, within the scope of the appended claims, may be made in the design and arrangement of the parts without departing from the spirit of the invention.

What is claimed is:

1. In a driving head, the combination which comprises a cylindrical body having a socket for receiving an adapter of a pneumatic hammer in one end and having a pipe receiving socket in the opposite end, said pipe receiving socket having a portion of reduced diameter extended into the body, a pilot pin extended through the outer portion of the socket and into the socket of reduced diameter, and means for retaining the pilot pin in the socket of the cylindrical body with the pilot pin free to swing laterally in the socket and whereby the pilot pin is arranged to be positioned in a pipe or tube with the end of the pipe or tube extended into the pipe receiving socket.

2. In a driving head, the combination which comprises a cylindrical body having a socket for receiving an adapter of a pneumatic hammer in one end and having a pipe receiving socket in the opposite end, said pipe receiving socket having a portion of reduced diameter extended into the body, a pilot pin extended through the outer portion of the socket and into the socket of reduced diameter, and a pivot pin mounted in the body and extended through the end of the pilot pin positioned in the socket of reduced diameter, the diameter of the pilot pin being less than the inside diameter of the socket in which the inner end of the pin is positioned.

3. In a driving head, the combination which comprises a cylindrical body having a socket for receiving an adapter of a pneumatic hammer in one end and having a pipe receiving socket in the opposite end, said pipe receiving socket having a portion of reduced diameter extended into the body, a pilot pin extended through the outer portion of the pipe receiving socket and into the socket of reduced diameter, and a pivot pin mounted in the body and extended through the end of the pilot pin positioned in the socket of reduced diameter, said pilot pin and pivot pin in the socket for receiving the end of a pipe being mounted to provide a pivotal movement between the pipe and pilot pin and body of the driving head.

References Cited in the file of this patent

UNITED STATES PATENTS

| | | |
|---|---|---|
| 2,147,829 | Daniels | Feb. 21, 1939 |
| 2,712,436 | McCune et al. | July 5, 1955 |

FOREIGN PATENTS

| | | |
|---|---|---|
| 277,422 | Great Britain | Sept. 15, 1927 |